(12) United States Patent
Luke et al.

(10) Patent No.: US 6,789,301 B1
(45) Date of Patent: Sep. 14, 2004

(54) SYSTEM AND METHOD FOR SPOTTING MOVABLE MOLD CORES

(75) Inventors: Michael A. Luke, Milford Center, OH (US); G. David Reffitt, East Liberty, OH (US); Hiroshi Sugawara, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 301 days.

(21) Appl. No.: 10/073,524

(22) Filed: Feb. 11, 2002

Related U.S. Application Data

(63) Continuation of application No. 09/813,542, filed on Mar. 21, 2001.

(51) Int. Cl.[7] .......................... B23Q 17/00; B25B 27/14
(52) U.S. Cl. ................. 29/407.09; 29/281.5; 29/407.1; 29/464; 425/468; 425/577; 100/99
(58) Field of Search .......................... 29/464, 465, 466, 29/281.5, 407.01, 407.09, 407.1; 76/4; 100/99, 257, 258 R, 918, 46; 425/468, 577

(56) References Cited

U.S. PATENT DOCUMENTS

| | | | | |
|---|---|---|---|---|
| 1,431,253 A | * | 10/1922 | Remnsnider ...................... 76/4 |
| 1,466,259 A | * | 8/1923 | Valentine ................... 76/107.1 |
| 1,551,125 A | * | 8/1925 | Valentine .......................... 76/4 |
| 1,669,845 A | * | 5/1928 | Valentine .......................... 76/4 |
| 1,791,757 A | * | 2/1931 | Glasner et al. ................... 76/4 |
| 2,155,482 A | * | 4/1939 | Glasner et al. ................... 76/4 |
| 2,172,209 A | * | 9/1939 | Laub .............................. 381/2 |
| 2,177,821 A | * | 10/1939 | Dinzl .......................... 340/678 |
| 2,218,818 A | * | 10/1940 | Harrington ....................... 76/4 |
| 2,248,464 A | * | 7/1941 | Richard et al. ................... 76/4 |
| 2,317,851 A | * | 4/1943 | Fullerton .......................... 76/4 |
| 2,344,692 A | * | 3/1944 | Fullerton .......................... 76/4 |
| 3,016,770 A | * | 1/1962 | Atols .............................. 76/4 |
| 3,118,407 A | * | 1/1964 | Robb .......................... 72/19.8 |
| 3,197,825 A | | 8/1965 | Hammond |
| 3,346,924 A | | 10/1967 | Lombard |
| 3,424,229 A | | 1/1969 | Gunnergaard-Poulsen |
| 3,596,318 A | | 8/1971 | Kyritsis et al. |
| 3,600,749 A | | 8/1971 | Munk et al. |
| 3,757,405 A | * | 9/1973 | Kurth et al. ................ 29/281.5 |
| 3,811,809 A | * | 5/1974 | Hitosugi ..................... 425/173 |
| 3,811,890 A | | 5/1974 | Hitosugi |
| 3,878,285 A | | 4/1975 | Souffie |
| 3,900,183 A | | 8/1975 | Wallace |
| 3,905,740 A | | 9/1975 | Lovejoy |
| 3,910,343 A | * | 10/1975 | Popov et al. ................ 164/340 |
| 4,206,799 A | | 6/1980 | McDonald |
| 4,278,417 A | | 7/1981 | Wilds et al. |
| 4,427,355 A | | 1/1984 | Vatterott |
| 4,481,161 A | | 11/1984 | Grannen, III |
| 4,531,704 A | | 7/1985 | Matthei |
| 4,596,916 A | * | 6/1986 | Inoue ....................... 219/69.14 |
| 4,676,731 A | | 6/1987 | Grannen, III |

(List continued on next page.)

*Primary Examiner*—Essama Omgba
(74) *Attorney, Agent, or Firm*—Standley Law Group, LLP

(57) ABSTRACT

An apparatus and method for allowing the spotting of one or more movable cores to mating portions of a mold. The present invention provides for the placement of a mold on a support structure and the releasable connection of each movable core to a force exerting device. The force exerting device allows for controlled and repeatable movement of the movable core or cores to which the force exerting device is attached. The present invention preferably also allows each movable core being spotted to be set to, and retracted from the mold, to a position where adjustments may be made to the movable core and/or the mating portion of the mold without removing the movable core therefrom. The present invention, therefore, provides for a higher quality and more efficient spotting of movable mold cores than is currently possible.

26 Claims, 6 Drawing Sheets

U.S. PATENT DOCUMENTS

| | | | | |
|---|---|---|---|---|
| 4,758,147 A | * | 7/1988 | Inaba | 425/186 |
| 4,768,747 A | | 9/1988 | Williams et al. | |
| 4,825,656 A | * | 5/1989 | Gardner Jr. | 60/668 |
| 4,904,008 A | | 2/1990 | Glance | |
| 4,976,601 A | * | 12/1990 | Tsuruta et al. | 425/182 |
| 5,002,479 A | * | 3/1991 | Brown et al. | 425/398 |
| 5,146,774 A | * | 9/1992 | Smith | 72/446 |
| 5,206,982 A | * | 5/1993 | Brown | 29/559 |
| 5,218,901 A | * | 6/1993 | Imanishi | 100/353 |
| 5,269,163 A | * | 12/1993 | Yagi et al. | 72/20.1 |
| 5,310,331 A | | 5/1994 | Wakebe et al. | |
| 5,333,369 A | * | 8/1994 | Miyairi et al. | 29/405 |
| 5,445,511 A | | 8/1995 | Ito et al. | |
| 5,638,301 A | * | 6/1997 | Smith et al. | 700/279 |
| 5,662,946 A | | 9/1997 | Pratt et al. | |
| 5,681,519 A | | 10/1997 | Kelman | |
| 5,762,855 A | | 6/1998 | Betters et al. | |
| 5,780,125 A | | 7/1998 | Takeuchi et al. | |
| 5,843,494 A | | 12/1998 | Richardson | |
| 5,862,853 A | | 1/1999 | Eliat | |
| 5,951,936 A | | 9/1999 | Coxhead | |
| 6,030,567 A | | 2/2000 | Takeuchi | |
| 6,060,004 A | | 5/2000 | Takeuchi et al. | |
| 6,068,807 A | | 5/2000 | Takeuchi et al. | |
| 6,103,167 A | | 8/2000 | Mukai et al. | |
| 6,136,249 A | | 10/2000 | Takeuchi et al. | |
| 6,328,553 B1 | * | 12/2001 | Joyner et al. | 425/190 |

* cited by examiner

SYSTEM AND METHOD FOR SPOTTING MOVABLE MOLD CORES

CROSS-REFERENCE TO RELATED APPLICATIONS

This application is a continuation of U.S. application Ser. No. 09/813,542, filed Mar. 21, 2001.

BACKGROUND AND SUMMARY OF THE INVENTION

The present invention relates to a method and system for assisting in the spotting of a movable mold core. The present invention includes the use of a movable core spotting apparatus that allows the necessary spotting to take place in a more efficient manner than is currently possible.

An increasing number of products are being produced today via some type of molding process. A multitude of products, once manufactured from metallic compounds, for example, are now produced from lighter and less expensive materials, such as, for example, plastics. The use of such materials and manufacturing techniques often allows for a product of fewer components and of lighter weight, but one that also retains sufficient strength.

Not only has the number of products produced via molding techniques increased, but so has the complexity of the products. Whether produced by injection, compression or other molding methods, molded products now often have complex geometries. Such geometries require generally more complicated molds and manufacturing methods. For example, modern plastic molds are often equipped with one or more slidable, or similarly movable cores, to form features such as undercuts not otherwise producible.

A typical mold, such as an injection mold, is generally comprised of two mold halves—one half containing a main cavity, and the other half having a main core. During mold development, a process generally referred to as spotting is used to ensure that clearances and areas of designed contact (shutoff) between mold halves are satisfactory. Spotting compound or another suitable marking product is generally applied to these areas of concern, and the mold is placed into a spotting press, which allows the mold halves to be repeatedly separated and reacquainted. In this manner, areas of the mold that should show contact, and do not, may be built up; while areas that should not show contact, and do, may be ground down. The spotting process may be repeated until the proper relationship between mold areas is achieved.

Just as is done with respect to the main mold halves, spotting is also used to ensure that the fit between the movable core, or cores, and the portion of the mold that receives each movable core is proper. With respect to a movable core, however, the spotting technique described above is generally not practicable. Because movable cores often move transversely, or otherwise at an angle to the general direction of movement of the main mold halves, a spotting press is generally not capable of imparting the proper plane of motion to a typical movable core. To accomplish spotting of a movable core, the mold half that communicates therewith is usually set on a work table or similar apparatus, and in a position that will allow the mating portion of the mold to best receive the movable core while still permitting access thereto for making adjustments. The movable core is then typically placed, by hand, into proper relation with the mold half, and checked for fit by placing spotting compound on areas of concern and manually causing the movable core to be set to, and retracted from, the mold. Adjusting the fit of the movable core to the mold typically requires numerous repetitions of setting and retracting the movable core, and welding and/or grinding on one, or both, of the movable core and the mating portion of the mold.

While manual manipulation of movable cores may be acceptable for smaller molds, on molds of relatively large size the movable cores may themselves exhibit substantial dimensions. Large movable cores are generally designed to be moved by a mating mold component or by hydraulic power derived from a molding press during the molding cycle—not by hand. Thus, with the intended method of movable core actuation generally not available for use during the spotting process, fitting a large movable core to a mold for spotting may require the use of, for example, a crane, pry bars, hammers and various other tools to lift the movable core into position and simulate its motion. For example, a crane may be required to lift the movable core to the mold, pry bars may be used to place the movable core into contact with the mating portion of the mold, and a slide hammer or similar device may be used to retract the movable core therefrom—after which the crane may again be required to remove the movable core to another location where operations such as grinding or welding may be performed thereon.

As the number of adjustments required to place the movable core and mating mold portion into proper relation may be considerable, a substantial expenditure of time by the person or persons performing the spotting operation is often required. In addition, the frequent handling of large movable cores by this technique also presents an increased possibility of damage to the main mold portion and movable mold cores. Therefore, it would be advantageous during the mold development process if it were possible to spot a movable core without having to repeatedly remove the movable core from the mold.

The present invention satisfies this need. The present invention discloses a movable mold core spotting method and apparatus that enables a mold, or a portion thereof, to be placed on a support structure or similar device designed to receive the mold and ensure its position. Each movable core requiring spotting is placed and aligned with the portion of the mold to which the movable core mates. A coupling means is provided for connection to each of the movable cores needing spotting. Each coupling means is further connectable to a force exerting device, such as, for example, a hydraulic cylinder, that may be activated to cause movement of the movable core or cores to which it is attached. Preferably, the force exerting device, or devices, are located substantially beneath the support structure, but alternatively, may be located outboard of each movable core. The location of each hydraulic cylinder or other force exerting device is preferably adjustable in three dimensions to provide for differences in location, center of mass, stroke length and other characteristics of the different movable cores to which the hydraulic cylinders will be attached. Other force exerting devices may also be employed depending upon the size of the movable cores involved, including, for example, pneumatic cylinders, and electric motors and gear assemblies.

When a hydraulic cylinder is provided to move a movable core, a hydraulic pump and reservoir is also provided to supply pressurized hydraulic fluid to the cylinder. Upon actuation of the hydraulic cylinder, the movable core may be set to, or retracted from, the mating portion of the mold without physical exertion by the worker involved. A flow control or similar device is preferably provided to afford control over the speed of movement of the movable core. The apparatus of the present invention is also preferably capable of retracting the movable core to a position which allows for ample accessibility to both the movable core and the section of the mold with which the movable core communicates.

Thus, the method and system of the present invention allows for the effective and efficient spotting of one or more movable mold cores, wherein the installation and removal of the movable core to the mold is minimized, and required movement of the movable core is accomplished by a force exerting device. The present invention minimizes damage to mold components, while also reducing the time necessary to successfully perform the core spotting operation.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENTS

Figure 1:
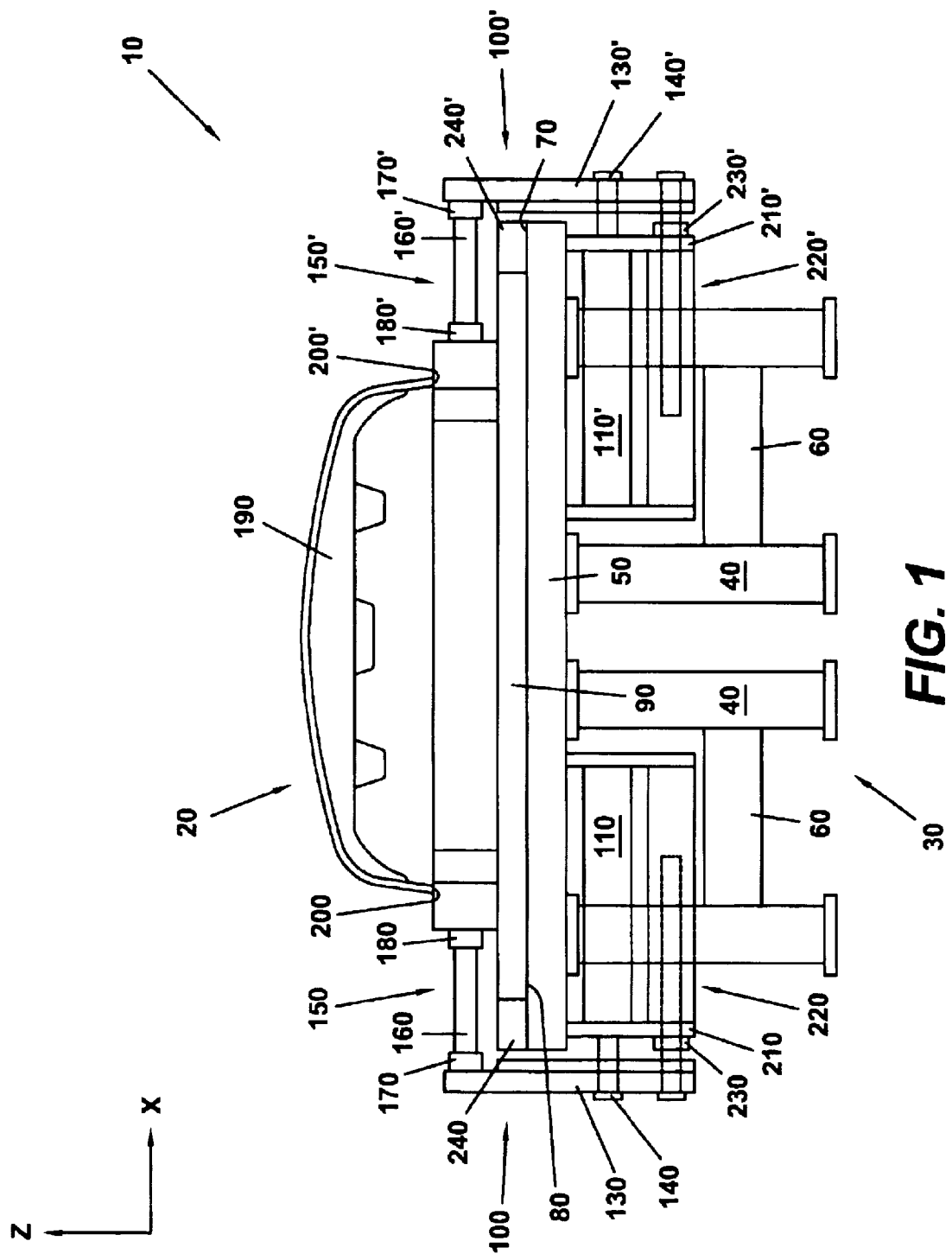
FIG. 1 is a front view of one embodiment of a movable mold core spotting apparatus of the present invention, having a mold half residing thereon.
Figure 2:
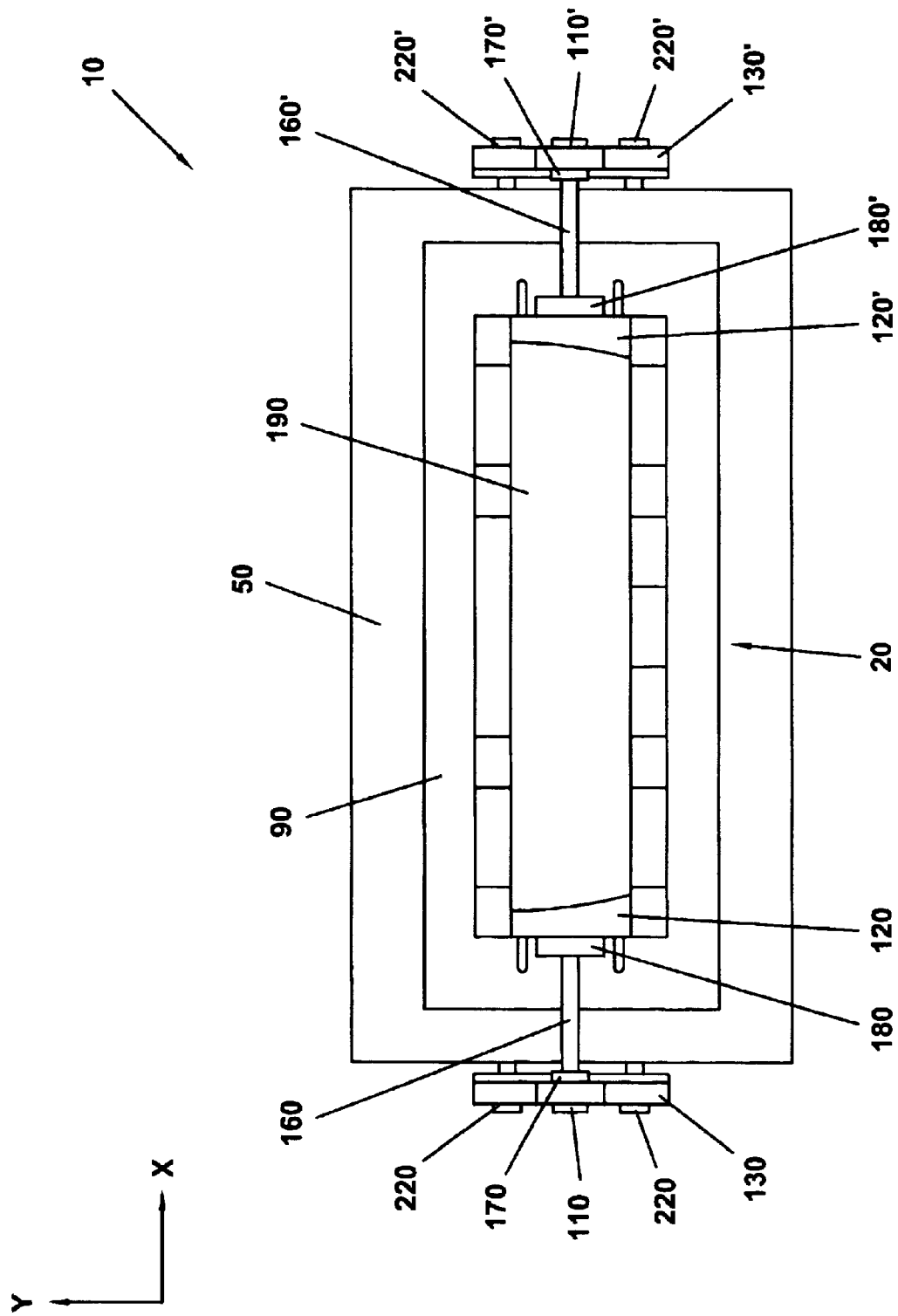
FIG. 2 is a top view of the movable mold core spotting apparatus of FIG. 1.
Figure 3:
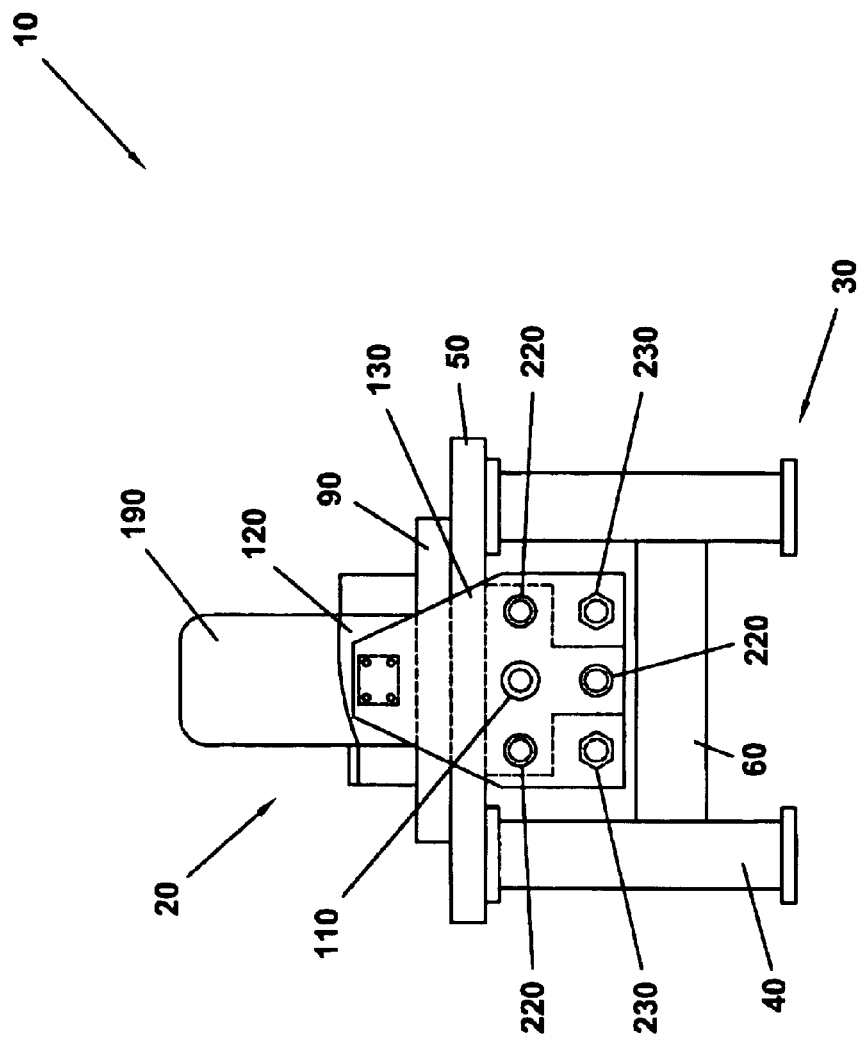
FIG. 3 is a left-side view of the movable mold core spotting apparatus of FIG. 1.

An exemplary embodiment of a movable mold core spotting apparatus 10 of the present invention is illustrated in FIGS. 1–3. While the particular embodiment depicted in FIGS. 1–3 shows a plastic bumper mold half 20, it should be realized that such an apparatus may be adapted for use with other molds of varying type and size.

In this particular embodiment, it can be seen that the movable mold core spotting apparatus 10 has a support structure 30. The support structure 30 preferably employs one or more vertical risers 40 or similar devices to buttress the mold half 20. Some, or all of the vertical risers 40 may be connected by cross-bracing 60 to help provide lateral strength to the support structure 30. As shown in this particular embodiment, an upper portion of the vertical risers 40 may be attached to, or otherwise communicate with a horizontally oriented support plate 50 that is adapted to accept the mold half 20. Alternatively, the vertical risers 40 may support the mold half 20 without the use of a support plate 60, such as, for example, by contacting the upper portion of the vertical risers directly with the mold back plate 90. It should be realized that the support structure 30 shown in FIGS. 1–3 is for purposes of illustration only, and support structures of other construction may also be employed without departing from the spirit and scope of the present invention.

If a support plate 50 is utilized, the upper surface 70 thereof is preferably equipped with dowel pins or other similar locating elements (not shown). These locating elements are provided to mate with corresponding features located on the back surface 80 of the back plate 90 of each mold that will be placed on the movable mold core spotting apparatus 10. If a support plate 60 is not employed in At the support structure 30, similar locating elements may be affixed to the top portion of the vertical risers 40 or other support devices used. Although locating elements are not required to practice the present invention, the use of such locating elements helps to ensure the proper alignment and repeated relocation of each mold to the movable mold core spotting apparatus 10.

Preferably attached to the support structure 30 are one or more core moving devices 100, 100', each of which generally consists of a force exerting device and a means for coupling the force exerting device to the movable core to which the force exerting device corresponds. Although various force exerting devices may be employed for this purpose, including, for example, pneumatic cylinders or electric motors and gear assemblies, in the specific embodiment shown in FIGS. 1–3 a separate hydraulic cylinder 110, 110' is used to cause movement of each of two movable cores 120, 120' (FIGS. 2 and 3). Alternatively, it should also be realized by one skilled in the art that a single force exerting device may be employed to move more than one movable core—such as may be accomplished, for example, by a double-rodded cylinder. When a support plate 50 is utilized, as shown In FIGS. 1–3, each force exerting device may be affixed thereto by a mounting plate 210, 210' or similar means. When a support plate 50 is not used, each force exerting device may be similarly attached to the vertical risers 40 or other support devices employed.

In this embodiment, each hydraulic cylinder 110, 110' is preferably attached to a drive arm 130, 130' via a cylinder coupling 140, 140'. The cylinder coupling 140, 140' may be rigid, or alternatively, may be flexible to allow for mismatch between the hydraulic cylinders 110, 110' and the other components of each core moving device 100, 100'. In an alternate embodiment, the rod of the hydraulic cylinders 110, 110' may be attached directly to the drive arms 130, 130' without the use of a cylinder coupling 140, 140', such as by threaded engagement, be for example.

Each of the drive arms 130, 130' are preferably affixed to the respective movable cores 120, 120' by means of a core-coupling assembly 150, 150'. Although other component combinations are possible, each of the core-coupling assemblies 150, 150' may consist of a connector 160, 160' and mounting plates 170, 170', 180, 180' for attaching the connector to the proper drive arm 130, 130' and movable core 120, 120', respectively. The connector 160, 160' may be of various configuration, such as, for example, a rod, a block, or a multitude of other structures that may suitably couple the drive arms 130, 130' to the movable cores 120, 120'. The connector 160, 160' may further be threaded or otherwise shaped to allow for quick attachment to the movable cores 120, 120' and the drive arms 130, 130'—with, or without mounting plates. The movable core mounting plates 180, 180' may make use of tapped holes or similarly existing features of the movable cores 120, 120' to provide for attachment.

Molds and movable mold cores of substantial size and weight may be placed on the support structure 30 for spotting purposes. Consequently, certain components of each core moving device 100, 100', such as the drive arms 130, 130' and hydraulic cylinders 110, 110' must be of correspondingly suitable size. It has been found that on drive arms 130, 130' of extended length, one or more guide pins 220, 220' or similar directing devices may be beneficial, although not essential, to obtaining the proper linear movement of the drive arms and corresponding movement of the movable cores 120, 120'. The guide pins 220, 220' may be located below and in line with the hydraulic cylinders 110, 110', as can be seen especially by reference to FIG. 3. Alternatively, guide pins 220, 220' may be located only above, only below, or only in line with the hydraulic cylinders, or various combinations of guide pin locations may be employed. As described above with reference to the mounting of the force exerting devices, the guide pins 220, 220' may be attached via the mounting plate 210, 210' or similar means to the support plate 50, if a support plate is used, or may also be attached to the vertical risers 40 or other support devices employed.

Although not necessary, one or more stops 230, 230' may be utilized to assist in controlling the inward-most stroke limit of each core moving device 100, 100'. The stops 230, 230' may further act to cushion the impact of the movable cores 120, 120' against a main core 190 of the mold 20 by contacting the drive arms 130, 130' and absorbing the energy of movement thereof. The stops 230, 230' may be of a solid material, may be of a deformable material, such as, for example, urethane or similar rubbers, or may be of spring-loaded or hydraulic construction.

As can be seen in FIGS. 1–3, the mold half 20 is placed on the support structure 30 and preferably releasably affixed to the optional support plate 50 by means of bolts or the like. The mold half 20 is shown to have a main core 190, to which each of the movable cores 120, 120' mate. In this particular mold, the movable cores 120, 120' are used to form an undercut 200, 200' in the finished part, and may also form other features located therein, such as, for example, slots or mounting holes. To accomplish the formation of this undercut 200, 200', the movable cores 120, 120' are caused to slide into, and out of, communication with the main core 190 during the molding cycle.

Although each mold placed on the movable mold core spotting apparatus 10 may be of similar size and geometry, it is also possible that the movable mold core spotting apparatus may be used to perform spotting on dissimilar molds. Therefore, it is preferable that each of the core moving devices 100, 100' be adjustable in preferably three dimensions, as indicated by the XYZ labeled arrows shown in each of FIGS. 1–3. For example, the hydraulic cylinder 110, 110' portion of each core moving device 100, 100' may be adjustable in the ±Y direction to account for the different center lines or centers of mass of the movable cores attached to different molds. The hydraulic cylinder 110, 110' portion of each core moving device 100, 100' may also be adjustable in the ±X direction to allow for different mold lengths, and variable movable core sizes and stroke distances. Adjustment of the hydraulic cylinder may be accomplished 110, 110' by, for example, a rack and pinion system, and/or by slotted mounting hardware. Similarly, the drive arm 130, 130' may be designed to accommodate different hydraulic cylinder 110, 110' to movable core 120, 120' distances, such as by slotting, thereby allowing the vertical (±Z) adjustment thereof. Graduated scales, levels, or similar other measuring devices may be placed on the movable mold core spotting apparatus 10 to assist in properly aligning each of the core moving devices 100, 100' with the corresponding movable cores 120, 120'.

To use the movable mold core spotting apparatus 10 of the present invention, an operator first places the proper mold or mold half 20 on the support structure 30 and preferably releasably affixes it to the support plate 50 or vertical risers 40, depending upon the particular configuration thereof. Each movable core 120, 120' that will be spotted using the movable mold core spotting apparatus 10 is then preferably placed into proper communication with the mating portion of the main core 190, although the movable cores could also be placed into communication with the mold and spotted one at a time. Typically, each movable core 120, 120' is aligned using a guiding means (not shown) provided on the mold 20 to direct the motion of the core.

The location of the appropriate core moving device 100, 100' may then be adjusted as needed for proper connection to the respective movable core 120, 120', and connected thereto. In the case of the embodiment shown in FIGS. 1–3, which uses a hydraulic cylinder 110, 110', a hydraulic pump (not shown) that is connected to a hydraulic fluid reservoir (not shown) is then turned on. The hydraulic pump and hydraulic fluid reservoir may be located at the movable mold core spotting apparatus 10, or may be located remotely. Preferably, flow controls or similar mechanisms are utilized and adjusted to prevent high-speed travel of the movable cores 120, 120' upon energizing of the hydraulic cylinders 110, 110' or other force exerting devices.

A remote actuator (not shown) may be provided for use by the operator of the movable mold core spotting apparatus 10. The remote actuator allows the operator to cause movement of the movable cores 120, 120' while maintaining some distance therefrom. Preferably, the movable cores 120, 120' may be moved individually, or together, as desired by the operator. Because of possible pinch points between the movable cores 120, 120' and the main core 190 to which the movable cores mate, pressure sensitive mats, photosensors, or other similar safety devices may be employed to prevent an operator from energizing the hydraulic cylinders 110, 110' or other force exerting devices while the operator is within a predetermined work envelope.

Areas of concern on the movable cores 120, 120' and/or on the mating mold portion may be coated with spotting compound, and the movable cores moved into contact with (set to) the mold half 20 by energizing the appropriate mold core moving device 100, 100'. The movable cores 120, 120' may then be retracted from the main core 190 and checked for indications of contact. Preferably, each core moving device 100, 100' retracts the corresponding movable core 120, 120' to a position that is sufficiently removed from the main core 190 to allow welding, grinding or other operations to be performed on the movable core without having to remove the movable core from the movable mold core spotting apparatus 10. This retracted position preferably also allows for accessibility to the mating portion of the main core 190, thereby permitting the performance of similar work thereon if needed. If necessary, spacer plates 240, 240' of appropriate thickness may be placed on the top surface 70 of the support plate 50, and substantially against an edge of the mold back plate 90, to provide an increased surface area for retraction of the movable cores 120, 120'. The setting and retracting of the movable cores 120, 120', and adjustment thereof, may be repeated as many times as is necessary to achieve the proper fit of the movable cores to the mold.

Figure 4:
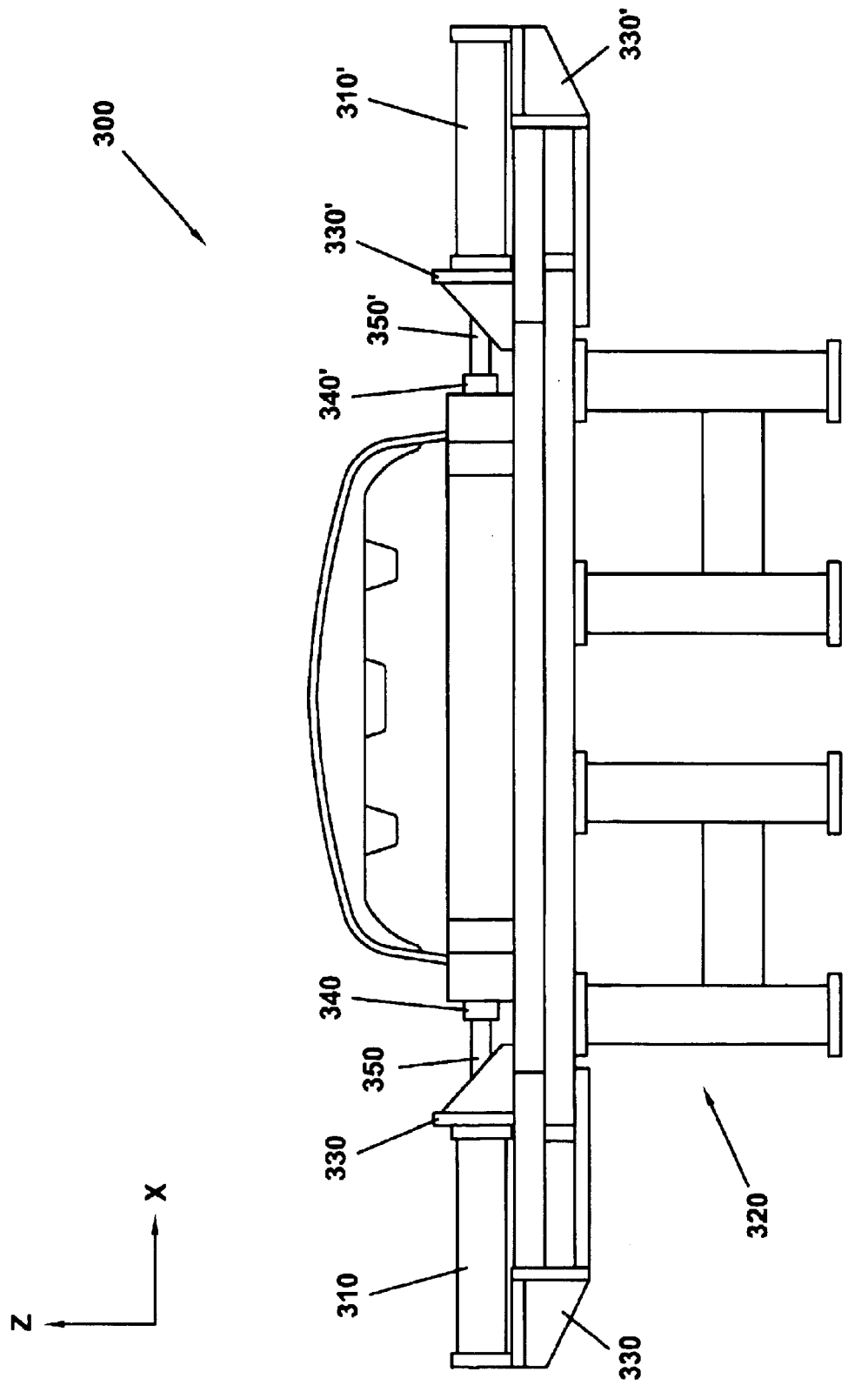
FIG. 4 is a front view depicting an alternate embodiment of a movable mold core spotting apparatus of the present invention.

An alternate embodiment of a movable mold core spotting apparatus 300 of the present invention is shown in FIG. 4. It can be seen that the movable mold core spotting apparatus 300 of FIG. 4 is similar to the movable mold core spotting apparatus 10 of FIGS. 1–3, except that the force exerting devices, in this is case, hydraulic cylinders 310, 310', are located outward and substantially in line with the movable cores rather than under the support structure 320. Hydraulic cylinder mounting brackets 330, 330' may be used to attach the hydraulic cylinders 310, 310'to the support structure 320. A cylinder coupling 340, 340', similar to that discussed above, may be utilized to connect each hydraulic cylinder to the respective movable core. Alternatively, the hydraulic cylinder rods 350, 350' may be threaded, may fit into a slotted plate, or may otherwise be adapted for quick attachment to, and detachment from, the movable cores.

Preferably, the movable mold core spotting apparatus 300 allows for the relationship between the hydraulic cylinders 310, 310' and the movable mold cores to be adjusted in preferably three dimensions. This may be accomplished, for example, by slotting the hydraulic cylinder mounting brackets 330, 330' to provide for location adjustment of the hydraulic cylinders 310, 310' in the ±X and ±Y directions, and placing spacers under the hydraulic cylinder mounting brackets to allow adjustment in the ±Z direction. The adjustments just described may be made by hand, or alternatively, could be made by mechanical device, such as, for example, a rack and pinion. Other means of adjustment are also possible, and are not meant to be foreclosed by the above examples.

Like the embodiment of the movable mold core spotting apparatus 10 shown in FIGS. 1–3 and discussed above, the movable mold core spotting apparatus 300 may include a remote actuator that affords a user of the apparatus the ability to stroke the movable cores from outside the work envelope. Pressure sensitive safety mats, photosensors, or similar safety devices may also be provided.

Figure 5:
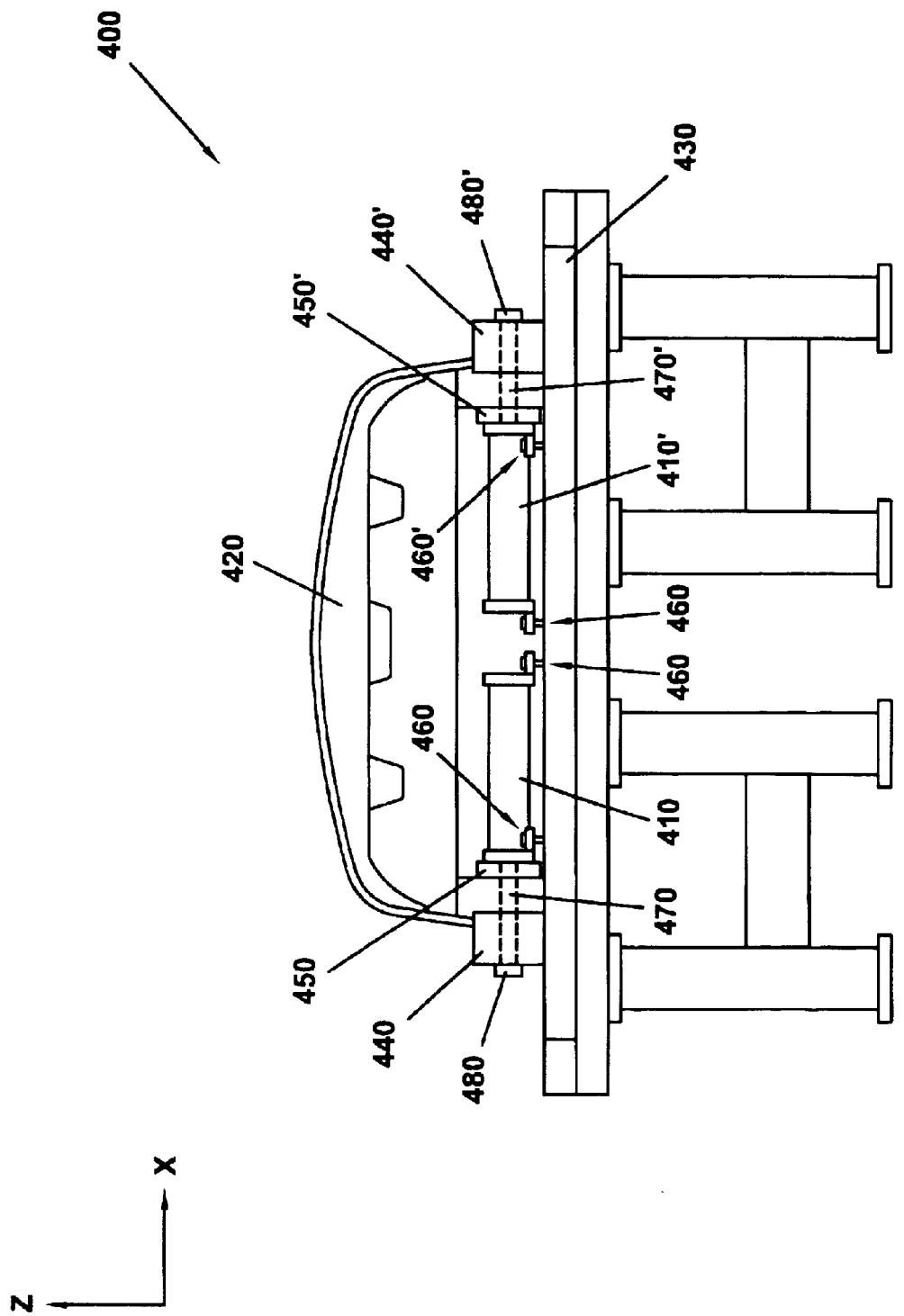
FIG. 5 is a front view depicting another exemplary embodiment of a movable mold core spotting apparatus of the present invention.

Referring now to FIG. 5, another embodiment of a movable mold core spotting apparatus 400 of the present invention that may be utilized on appropriate molds can be seen. As is shown, the movable mold core spotting apparatus 400 of FIG. 5 is similar to the movable mold core spotting apparatus 300 of FIG. 4, except that the force exerting devices, in this case, hydraulic cylinders 410, 410', are located in an open area between the main mold core 420 and the top surface of the mold back plate 430 rather than outward of each movable core 440, 440'.

Hydraulic cylinder mounting brackets 450, 450' may be used to attach the' hydraulic cylinders 410, 410' to the main mold core 420. Preferably, each cylinder mounting bracket 450, 450' is provided with slots or other adjusting means to allow for proper alignment of the cylinder to which it is mounted. A height adjusting device 460, 460' is also preferably provided on each hydraulic cylinder 410, 410' to assist in aligning the center line thereof with the movable core 440, 440' to which the cylinder is attached. The hydraulic cylinder rods 470, 470' may pass through the movable cores 440, 440' as shown, and attach thereto with a coupling member 480, 480'. Alternatively, rather than pass through the movable cores 440, 440', the hydraulic cylinder rods 470, 470' may attach to an inside portion thereof. Additionally, in place of utilizing a coupling member 480, 480' for attachment, the cylinder rods 470, 470' may be threaded, may fit into a slotted plate, or may otherwise be adapted for quick attachment to, and detachment from, the movable cores 440, 440'.

Like the embodiments of the movable mold core spotting apparatus 10, 300 shown in FIGS. 1–4 and discussed above, the movable mold core spotting apparatus 400 may include a remote actuator that affords a user of the apparatus the ability to stroke the movable cores from outside the work envelope. Pressure sensitive safety mats, photosensors, or similar safety devices may also be provided.

Figure 6:
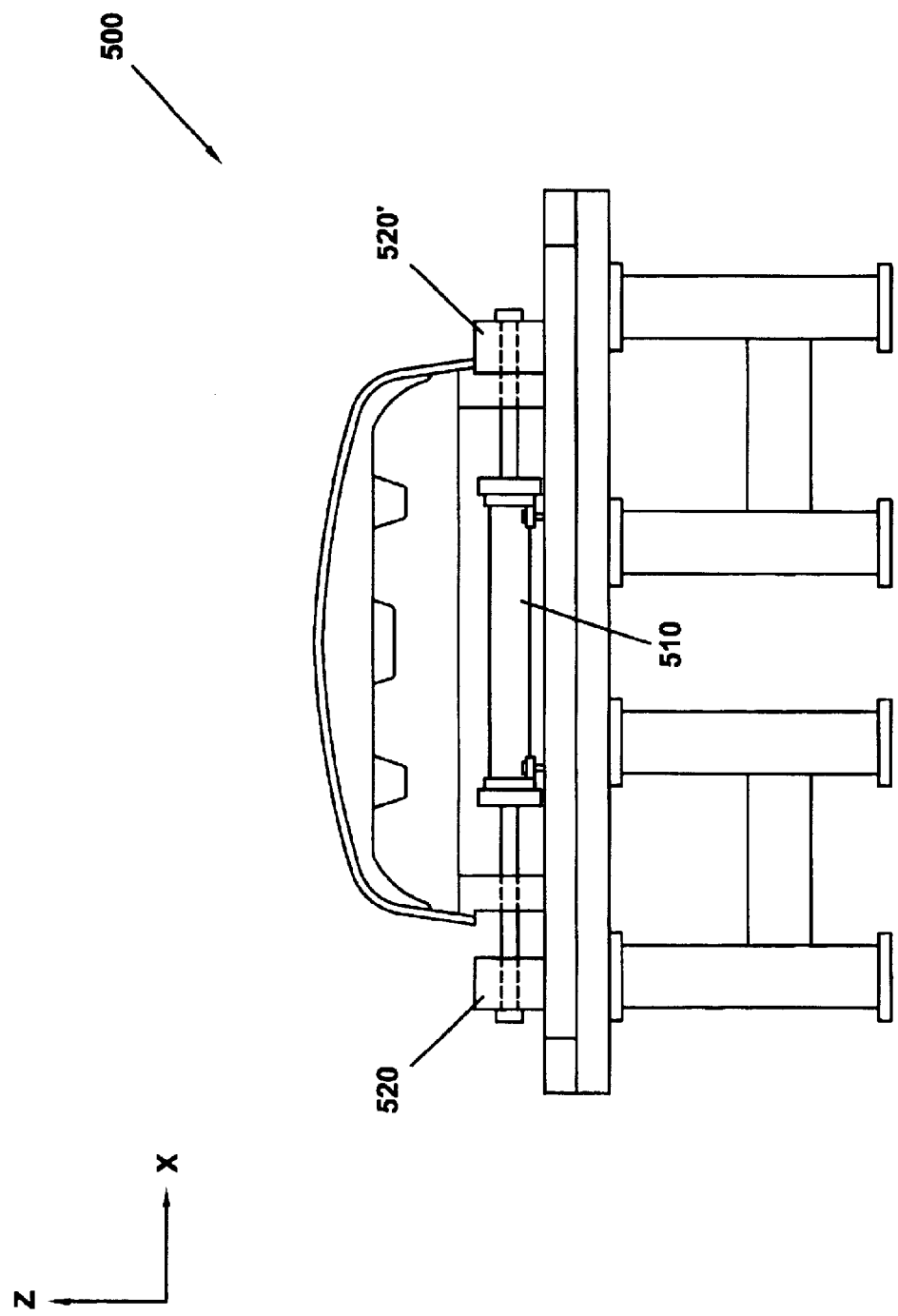
FIG. 6 is a front view illustrating yet another exemplary embodiment of a movable mold core spotting apparatus of the present invention, wherein a single force exerting device is used to move more than one moveable mold core.

Another embodiment of a movable mold core spotting apparatus 500 of the present invention is illustrated in FIG. 6. As is shown, the movable mold core spotting apparatus of FIG. 6 is similar to the movable mold core spotting apparatus 400 of FIG. 5, except that a single force exerting device, in this case, a double-rodded hydraulic cylinder 510, is used to move both movable cores 520, 520'. The double-rodded hydraulic cylinder 510 may be attached in a similar manner to the hydraulic cylinders 410, 410' shown in FIG. 5. Preferably, the apparatus 500 of FIG. 6 is also fully adjustable to allow the apparatus to be used with molds/mold cores of different size and/or shape (see description of the apparatus 400 of FIG. 5). As with the previous embodiments, a remote actuator and various safety interlocks may be employed when using the apparatus 500 of FIG. 6.

The movable mold core spotting apparatus and method of spotting a movable mold core disclosed by the present invention provides for a higher quality, and more efficient spotting operation. The improved accuracy and repeatability of setting the movable cores permits the spotting process to be accomplished with fewer operations and in less time. The reduced handling of the movable cores minimizes the likelihood that damage to the movable cores or other portions of the mold will occur.

For purposes of illustration, and not limitation, certain exemplary embodiments of a movable mold core spotting apparatus and method of spotting a movable mold core have been described above. While these embodiments are representative of what is contemplated by the present invention, the scope of the invention is not to be considered limited by such disclosure, and modifications are possible to both the apparatus and methods herein described without departing from the spirit of the invention as evidenced by the following claims:

What is claimed is:

1. A movable mold core spotting apparatus, said apparatus comprising:
   a support structure for receiving all or a portion of various molds having at least one moveable core; and
   at least one force exerting device, said at least one force exerting device affixed to a portion of said support structure and having a moving portion adapted for releasable attachment to said at least one movable core of said various molds;
   wherein said at least one force exerting device is affixed to said support structure in a manner that allows the position of said at least one force exerting device to be adjusted as needed to accommodate molds of different size and/or shape and to provide for proper movement of said at least one moveable core associated therewith; and
   wherein, by activation of said at least one force exerting device, said at least one movable core may be mated to and separated from a mating portion of its respective mold as often as necessary during the process of spotting said movable core to said mold.

2. The movable mold core spotting apparatus of claim 1, wherein said mold has multiple movable cores, each of said movable cores releasably attached to a force exerting device.

3. The movable mold core spotting apparatus of claim 1, wherein a single force exerting device is releasably attached to, and otherwise adapted to move more than one movable core.

4. The movable mold core spotting apparatus of claim 1, wherein said at least one force exerting device is a hydraulic cylinder.

5. The movable mold core spotting apparatus of claim 1, wherein said at least one force exerting device is a pneumatic cylinder.

6. The movable mold core spotting apparatus of claim 1, wherein said at least one force exerting device is an electric motor and gear assembly.

7. The movable mold core spotting apparatus of claim 1, further comprising at least one coupling device for releasably coupling said at least one force exerting device to said at least one movable mold core.

8. The movable mold core spotting apparatus of claim 7, wherein said at least one coupling device is adjustable relative to its point of attachment to each of said at least one force exerting device and said at least one movable core.

9. The movable mold core spotting apparatus of claim 7, further comprising at least one location indicating device for assisting in the alignment of said at least one coupling device to said at least one movable core.

10. The movable mold core spotting apparatus of claim 7, further comprising at least one location indicating device for assisting in the alignment of said at least one coupling device to said at least one force exerting device.

11. The movable mold core spotting apparatus of claim 1, further comprising at least one locating element residing between a top surface of said support structure and a back surface of a backing plate of said mold, said at least one locating element provided to ensure accurate and repeatable location of said mold to said support structure.

12. The movable mold core spotting apparatus of claim 1, further comprising means for releasably affixing said mold or a portion thereof to said support structure.

13. The movable mold core spotting apparatus of claim 1, further comprising at least one spacer plate, said spacer plate releasably affixed to a top surface of said support structure and substantially against an edge of a backing plate of said mold, said spacer plate provided to account for the height of said backing plate during the movement of said movable core.

14. The movable mold core spotting apparatus of claim 1, wherein said at least one force exerting device resides substantially beneath said support structure.

15. The movable mold core spotting apparatus of claim 1, wherein said at least one force exerting device resides outward of and substantially in line with the movable core to which it is attached.

16. A method for spotting a movable mold core to a mold, said method comprising the steps of:
 (a) placing a mold or a portion thereof onto a support structure, said support structure having at least one force exerting device affixed thereto in a manner that allows for its positional adjustability;
 (b) locating at least one movable mold core requiring spotting to a mating portion of said mold;
 (c) adjusting the position of said at least one force exerting device as needed to provide for proper alignment with said at least one moveable mold core and to retract said at least one moveable mold core an adequate distance from said mold;
 (d) releasably attaching a movable portion of said at least one force exerting device to said at least one movable mold core requiring spotting;
 (e) moving said at least one movable mold core requiring spotting into and out of contact with a mating portion of said mold by activation of said at least one force exerting device;
 (f) checking one or more areas of interest on said movable mold core being spotted and/or one or more areas of interest on said mating portion of said mold for proper fit therebetween;
 (g) adjusting said one or more areas of interest on said movable mold core being spotted and/or said one or more areas of interest on said mating portion of said mold as required; and
 (h) repeating steps (e)–(g) as necessary until the fit between said at least one movable mold core and said mating portion of said mold is acceptable.

17. The method of claim 16, further comprising providing at least one coupling device for releasably coupling said at least one movable mold core to said at least one force exerting device.

18. The method of claim 17, further comprising adjusting the location of said at least one coupling device for proper releasable attachment to said at least one movable mold core.

19. The method of claim 16, further comprising releasably affixing said mold to said support structure.

20. The method of claim 16, further comprising one or more locating elements for ensuring accurate and repeatable location of said mold to said support structure.

21. The method of claim 16, further comprising providing at least one spacer plate, said spacer plate releasably affixed to a top surface of said support structure and substantially against an edge of a backing plate of said mold, said spacer plate provided to account for the height of said backing plate during the movement of said movable core.

22. The method of claim 16, further comprising applying a marking material to said one or more areas of interest on said movable core being spotted and/or one or more areas of interest on said mating portion of said mold, to assist in indicating the fit between said movable mold core being spotted and said mating portion of said mold.

23. The method of claim 16, further comprising the use of at least one remote actuator to activate said at least one force exerting device.

24. The method of claim 16, further comprising one or more safety devices adapted to prevent activation of said at least one force exerting device while one or more persons is present within a predetermined zone.

25. The method of claim 16, wherein said movable mold cores may be moved individually or in groups of various number.

26. A movable mold core spotting apparatus, said apparatus comprising:
 a support structure for receiving all or a portion of various molds, each having at least one moveable core;
 at least one force exerting device for moving said at least one moveable core into and out of contact with a mating portion of its respective mold;
 a mounting means for affixing said at least one force exerting device to said support structure such that the position of said at least one force exerting device with respect to said support structure can be easily adjusted in three dimensions; and
 a coupling means for providing releasable attachment of said force exerting device to said at least one moveable core;
 wherein; by activation of said at least one force exerting device, said at least one movable core may be mated to and separated from a mating portion of its respective mold as often as necessary during the process of spotting said movable core to said mold; and
 wherein said mounting means allows said at least one force exerting device to operate moveable cores on molds of various size and/or shape.

* * * * *